US010875017B2

(12) United States Patent
Solomon et al.

(10) Patent No.: US 10,875,017 B2
(45) Date of Patent: Dec. 29, 2020

(54) MICROFLUIDIC SERIAL DILUTION PLATFORM BASED WELL-PLATE USING AN OIL-FREE IMMISCIBLE PHASE DRIVEN BY MANUAL OR ELECTRONIC PIPETTORS

(71) Applicant: Neofluidics LLC, Lubbock, TX (US)

(72) Inventors: Deepak Solomon, San Diego, CA (US); Nilesh Gupta, San Diego, CA (US)

(73) Assignee: NEOFLUIDICS LLC, San Diego, CA (US)

( * ) Notice: Subject to any disclaimer, the term of this patent is extended or adjusted under 35 U.S.C. 154(b) by 401 days.

(21) Appl. No.: 15/005,341

(22) Filed: Jan. 25, 2016

(65) Prior Publication Data
US 2016/0214108 A1  Jul. 28, 2016

Related U.S. Application Data

(60) Provisional application No. 62/107,132, filed on Jan. 23, 2015.

(51) Int. Cl.
*B01L 3/00* (2006.01)
*G01N 1/38* (2006.01)
(Continued)

(52) U.S. Cl.
CPC .... *B01L 3/502715* (2013.01); *B01F 13/0083* (2013.01); *B01F 15/0404* (2013.01);
(Continued)

(58) Field of Classification Search
CPC ..... B01L 2300/0864; B01L 2300/0883; B01L 2400/0406; B01L 3/502715;
(Continued)

(56) References Cited

U.S. PATENT DOCUMENTS 7,708,949 B2  5/2010  Stone et al.
8,592,221 B2  11/2013  Fraden et al.
(Continued)

FOREIGN PATENT DOCUMENTS

CA  2521862      10/2012
EP  2364774 A3   6/2016
(Continued)

OTHER PUBLICATIONS

Resto, Pedro J. et al., "High Speed Droplet-based Delivery System for Passive Pumping in Microfluidic Devices", Sep. 2, 2009, Journal of Visual Experiments, Issue 31, p. 1-5. (Year: 2009).*
(Continued)

*Primary Examiner* — Lyle Alexander
*Assistant Examiner* — Bryan Kilpatrick
(74) *Attorney, Agent, or Firm* — Katten Muchin Rosenman LLP

(57) ABSTRACT

Described is a microfluidic serial dilution platform based well-plate using an oil-free immiscible phase driven by manual or electronic pipettors. The well-plate includes a plurality of fluidic traps, a plurality of hydrophilic capillary constriction channels and a plurality of bypass channels. Each of the plurality of bypass channels is associated with one of the plurality of fluidic traps, each of the plurality of hydrophilic capillary constriction channels is associated with one of the plurality of fluidic traps, and each of the plurality of fluidic traps is associated with one of the plurality of bypass channels and one of the plurality of hydrophilic capillary constriction channels. The well-plate further includes an inlet, an outlet, and a main channel with a plurality of portions that connects the inlet to the plurality of fluidic traps, associated hydrophilic capillary constriction channels and associated bypass channels, and the outlet.

19 Claims, 18 Drawing Sheets

(51) Int. Cl.
  *B01F 13/00* (2006.01)
  *B01F 15/04* (2006.01)
(52) U.S. Cl.
  CPC ........ *G01N 1/38* (2013.01); *B01L 2200/0605*
    (2013.01); *B01L 2300/0816* (2013.01); *B01L*
    *2300/0838* (2013.01); *B01L 2300/0864*
    (2013.01); *B01L 2300/0883* (2013.01); *B01L*
    *2400/0406* (2013.01); *B01L 2400/0688*
    (2013.01); *G01N 2001/383* (2013.01)
(58) Field of Classification Search
  CPC ......... B01L 2200/06; B01L 2300/0838; G01N
      1/38; G01N 2001/383; G01N 33/54366;
                        G01N 35/10
  See application file for complete search history.

(56) References Cited

U.S. PATENT DOCUMENTS

| | | | |
|---|---|---|---|
| 8,765,485 | B2 | 7/2014 | Link et al. |
| 2002/0036018 | A1* | 3/2002 | McNeely ............... B01F 5/0403 137/806 |
| 2002/0075363 | A1 | 6/2002 | McNeely et al. |
| 2003/0138829 | A1 | 7/2003 | Unger et al. |
| 2004/0137607 | A1* | 7/2004 | Tanaami ........... B01L 3/502715 435/287.2 |
| 2004/0206408 | A1 | 10/2004 | Peters et al. |
| 2006/0018790 | A1 | 1/2006 | Naka et al. |
| 2007/0195127 | A1 | 8/2007 | Ahn et al. |
| 2010/0252118 | A1* | 10/2010 | Fraden ................... G01N 1/28 137/2 |
| 2012/0244043 | A1* | 9/2012 | Leblanc ........... B01L 3/502715 422/504 |
| 2013/0337578 | A1 | 12/2013 | Delamarche et al. |
| 2014/0246098 | A1 | 9/2014 | Fraden et al. |

FOREIGN PATENT DOCUMENTS

| | | |
|---|---|---|
| WO | 2006096571 A2 | 9/2006 |
| WO | 2010111231 A1 | 9/2010 |
| WO | 2012154688 A2 | 11/2012 |
| WO | 2016/187561 A1 | 11/2016 |
| WO | 2016/201430 A1 | 12/2016 |

OTHER PUBLICATIONS

International Search Report dated Jun. 2, 2016 for PCT/US16/14704.
Xiaowen Huang et al., "On-Site Formation of Emulsions by Controlled Air Plugs",SMALL, vol. 10, No. 4, Feb. 1, 2014 (Feb. 1, 2014), pp. 758-765.
Extended European Search Report for European Patent Application No. 16 74 0896, dated Jun. 6, 2018.
Communication pursuant to Article 94(3) EPC for European Patent Application No. 16 740 896.2 dated May 9, 2019.
Communication pursuant to Article 94(3) EPC for European Patent Application No. 16 740 896.2 dated Sep. 21, 2020.

\* cited by examiner

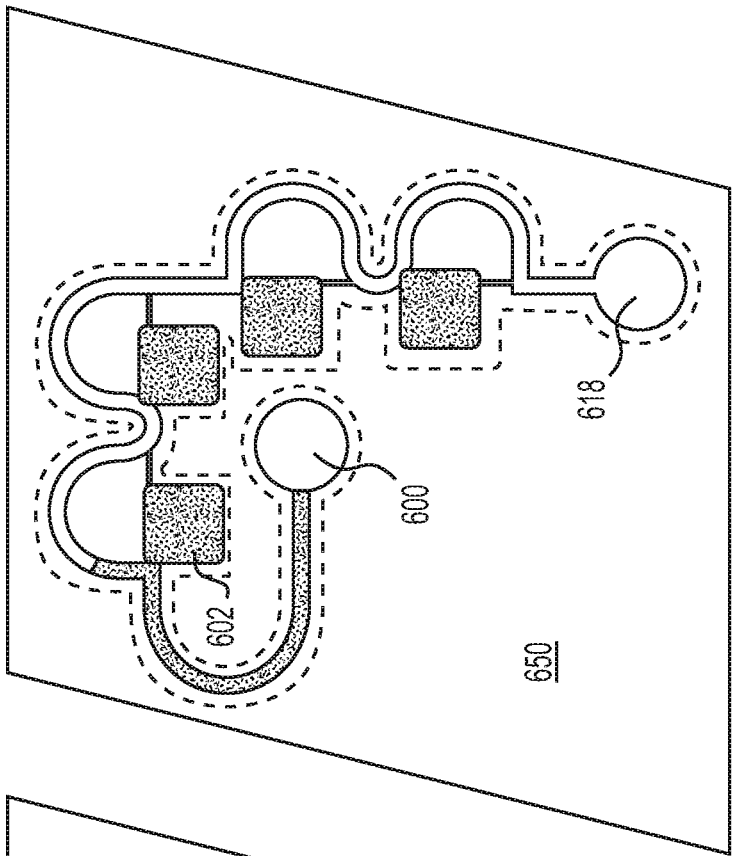
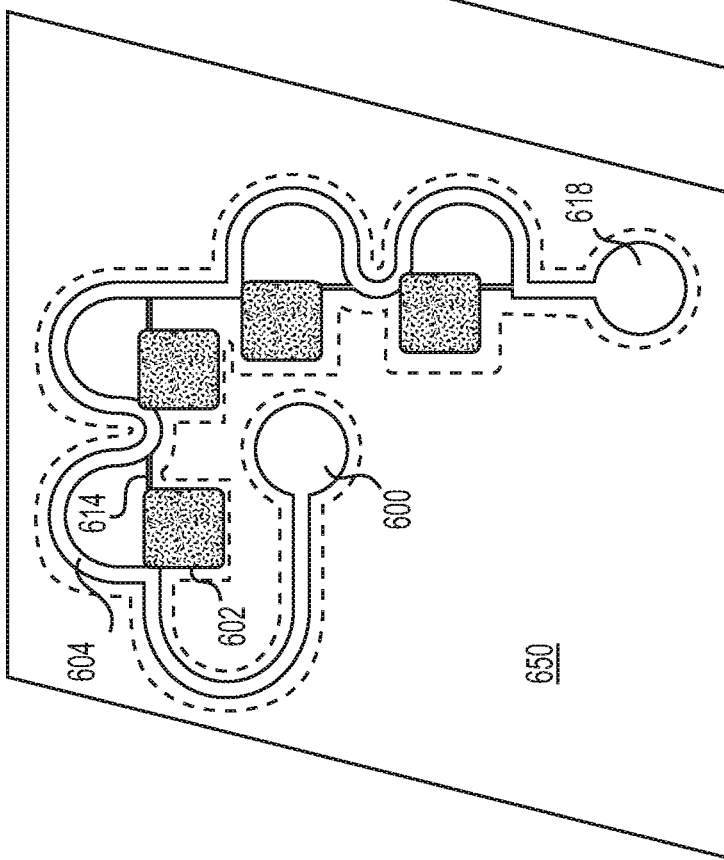

| CELL COUNTING EXPERIMENTS | HEMOCYTOMETER | CHIP W/O TRYPAN BLUE | CHIP WITH TRYPAN BLUE |
|---|---|---|---|
| TEST 1 | $6.7 \times 10^6$ CELLS/ml | $6.65 \times 10^6$ CELLS/ml | X |
| TEST 2 | $4.7 \times 10^6$ CELLS/ml | X | $5.01 \times 10^6$ CELLS/ml |

*FIG. 9A*

| PARAMETERS | HEMOCYTOMETER | NEOPLATE |
|---|---|---|
| TIME TO LOAD CELLS | 45-60 SEC | 5-6 SEC |
| TIME TO COUNT CELLS | 5-6 MIN | 1.5-2 MIN |
| TOTAL TIME TO GET CELL COUNT | 7-8 MIN | 2-2.5 MIN (70-75% REDUCTION IN TIME) |
| DISTRIBUTION OF CELLS IN 4 QUADRANTS | UNEVEN | EVEN |
| EASE OF HANDLING | NOT EASY | VERY EASY |
| HOW DELICATE? | VERY DELICATE | ROBUST |
| REUSABILITY | REUSABLE | REUSABLE |
| OTHER FUNCTIONS | NO | CAN BE USED FOR CELL BASED EXPERIMENTS SUCH AS ASSAY, STAINING ETC. |

*FIG. 9C*

MICROFLUIDIC SERIAL DILUTION PLATFORM BASED WELL-PLATE USING AN OIL-FREE IMMISCIBLE PHASE DRIVEN BY MANUAL OR ELECTRONIC PIPETTORS

RELATED APPLICATIONS

This application claims priority of U.S. Provisional Application Ser. No. 62/107,132, entitled "A MICROFLUIDIC SERIAL DILUTION PLATFORM BASED WELL-PLATE USING AN OIL-FREE IMMISCIBLE PHASE DRIVEN BY MANUAL OR ELECTRONIC PIPETTORS," and herein incorporated by reference in its entirety.

BACKGROUND

Currently, microfluidic devices that can achieve storage of nano-pico liter volumes of droplets use either upstream mechanisms (such as T-junction or Y-junctions) or external force driven methods (electric, magnetic or acoustic). See, for example, the following published applications and patents US PGPUB 20070195127, WO 2010111231, U.S. Pat. No. 723,826, U.S. Pat. No. 7,708,949, EP2364774, U.S. Pat. No. 8,765,485 and WO2006096571. Passive methods include the fragmentation of a long slug of fluid into droplets in a hydrophobic microfluidic network by using an immiscible phase (usually oil). In order to use this passive method, the current state of the art requires that the traps be pre-filled with the immiscible oil-phase. This creates a capillary plug in the constriction that immediately follows the trap to ensure that the droplets do not escape from the traps and to accomplish uniform droplet trapping. See, for example, the following published applications and patents: U.S. Pat. No. 8,592,221, CA2521862 and WO2012154688.

Once these droplets are trapped in these pre-defined sites, current methods used to achieve serial dilution of these stored droplets rely on coalescence between the diluting stream and the trapped droplets when these two components meet in the larger entrance channel of the trap. This causes the composition of the diluting plug to be altered which in turn can cause adverse reactions in this plug as it coalesces with droplets further downstream in the network.

There are a number of disadvantages of the above-described current techniques. For example, current techniques require precise fluidic control and additional external manifolds and controls. The immiscible oil phase (a contaminant in some processes) is required in the traps prior to droplet trapping to prevent drops from escaping from the traps. Additionally, the dilution mechanism of current methods can cause contamination of downstream traps in the network. Moreover, the non-uniform trapping of particles (e.g., cells) in traps in methods that use the fragmentation of a long fluidic slug.

SUMMARY

Described herein are embodiments of a microfluidic serial dilution platform based well-plate using an oil-free immiscible phase driven by manual or electronic pipettors that overcomes the defects of the prior art. These and other advantages are achieved by a microfluidic serial dilution platform based well-plate using an oil-free immiscible phase driven by manual or electronic pipettors. The well-plate includes a plurality of fluidic traps, a plurality of hydrophilic capillary constriction channels and a plurality of bypass channels. Each of the plurality of bypass channels is associated with one of the plurality of fluidic traps, each of the plurality of hydrophilic capillary constriction channels is associated with one of the plurality of fluidic traps, and each of the plurality of fluidic traps is associated with one of the plurality of bypass channels and one of the plurality of hydrophilic capillary constriction channels. The well-plate further includes an inlet, an outlet, and a main channel with a plurality of portions that connects the inlet to the plurality of fluidic traps, associated hydrophilic capillary constriction channels and associated bypass channels, and the outlet.

These and other advantages are also achieved by a microfluidic serial dilution platform based well-plate using an oil-free immiscible phase driven by manual or electronic pipettors. The well-plate includes a plurality of fluidic traps, a plurality of hydrophobic capillary constriction channels, and a plurality of bypass channels. Each of the plurality of bypass channels is associated with one of the plurality of fluidic traps, each of the plurality of hydrophobic capillary constriction channels is associated with one of the plurality of fluidic traps, and each of the plurality of fluidic traps is associated with one of the plurality of bypass channels and one of the plurality of hydrophobic capillary constriction channels. The well-plate also includes an inlet, an outlet, and a main channel with a plurality of portions that connects the inlet to the plurality of fluidic traps, associated hydrophobic capillary constriction channels and associated bypass channels, and the outlet.

BRIEF DESCRIPTION OF THE DRAWINGS

Embodiments of a system and method for network data characterization and/or classification are understood and described in conjunction with the following drawings, wherein:

FIGS. 6A-6B are diagrams illustrating a hydrophobic operation of a hydrophobic embodiment of the microfluidic serial dilution platform based well-plate using an oil-free immiscible phase driven by manual or electronic pipettors, particularly a serial dilution process of the operation.

FIG. 9A is a table illustrating results of an experiment using a hydrophobic embodiment of the microfluidic serial dilution platform based well-plate using an oil-free immiscible phase driven by manual or electronic pipettors as a hemocytometer.

FIG. 9C is a chart illustrating advantages of hydrophobic embodiment of the microfluidic serial dilution platform based well-plate using an oil-free immiscible phase driven by manual or electronic pipettors versus a standard hemocytometer.

DETAILED DESCRIPTION

Described herein are embodiments of a microfluidic serial dilution platform based well-plate using an oil-free immiscible phase driven by manual or electronic pipettors. Embodiments overcome the problems described above. For example, embodiments provide a passive method based device for storage and serial dilution of fluids in a microfluidic storage network. Embodiments include a microfluidic platform based well-plate using an oil-free immiscible phase driven by manual or electronic pipettors. Embodiments provide a novel mechanism for storage and serial dilution of droplets in a hydrophilic microfluidic device using conventional pipetting system.

Embodiments overcome the problems of the prior art. For example, by using an air-based immiscible phase for droplet trapping, embodiments eliminate the possibility of a reaction between typically-used oil-based immiscible phases and trapped fluid. Likewise, the novel serial dilution by the formation of micro-droplets in the network provided by embodiments prevents the composition of the diluting slug from being changed. Additionally, the elimination of precise fluidic control allows the storage and dilution of droplets in the network to be accomplished by conventional pipetting systems. The incorporation of these networks into a well-plate based device that integrates with multi-head robotic and manual pipettors eliminates the need for any additional capital equipment. The trapping and dilution is performed in a completely passive manner (without use of electric or magnetic fields), reducing the cost of the device. Embodiments provide a similar or higher throughput compared to currently available robotic high-throughput screening systems. Moreover, embodiments provide the ability to remove fluids trapped in square hydrodynamic traps with a reversal of the direction of flow in one step without the formation of emulsions. Embodiments also enable uniform trapping of cells and other particles suspended in a fluid over the entire network of traps. This is particularly important in cell-based screening studies.

Figure 1A:
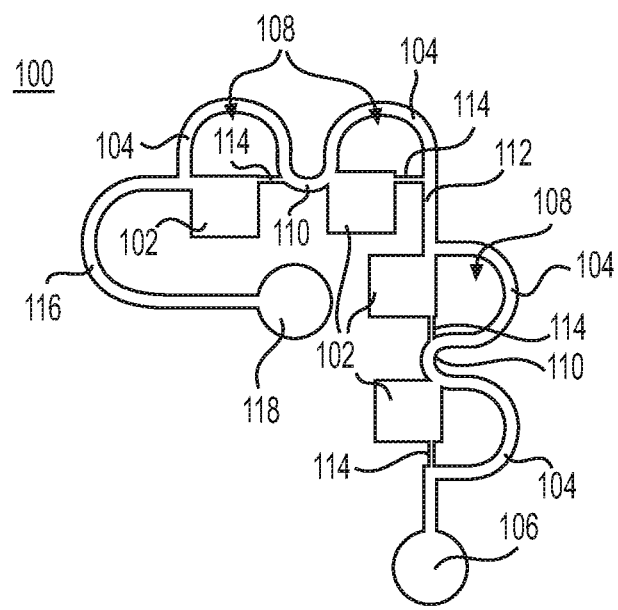
FIGS. 1A-1D are diagrams illustrating a hydrophilic embodiment of a microfluidic serial dilution platform based well-plate using an oil-free immiscible phase driven by manual or electronic pipettors.
Figure 1B:
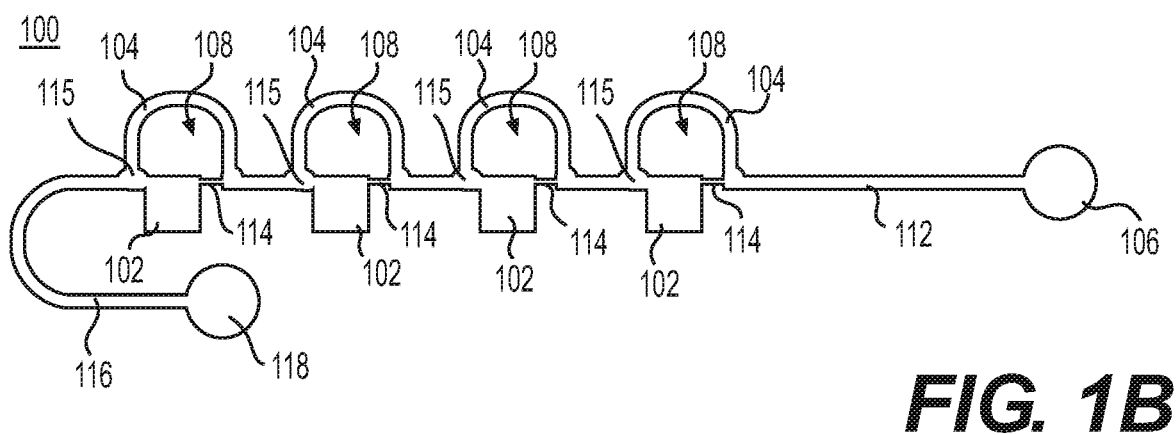
Figure 1C:
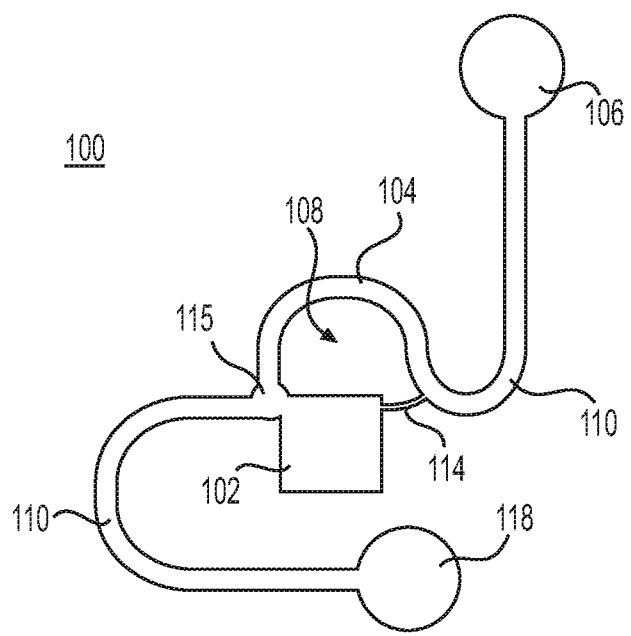
Figure 1D:
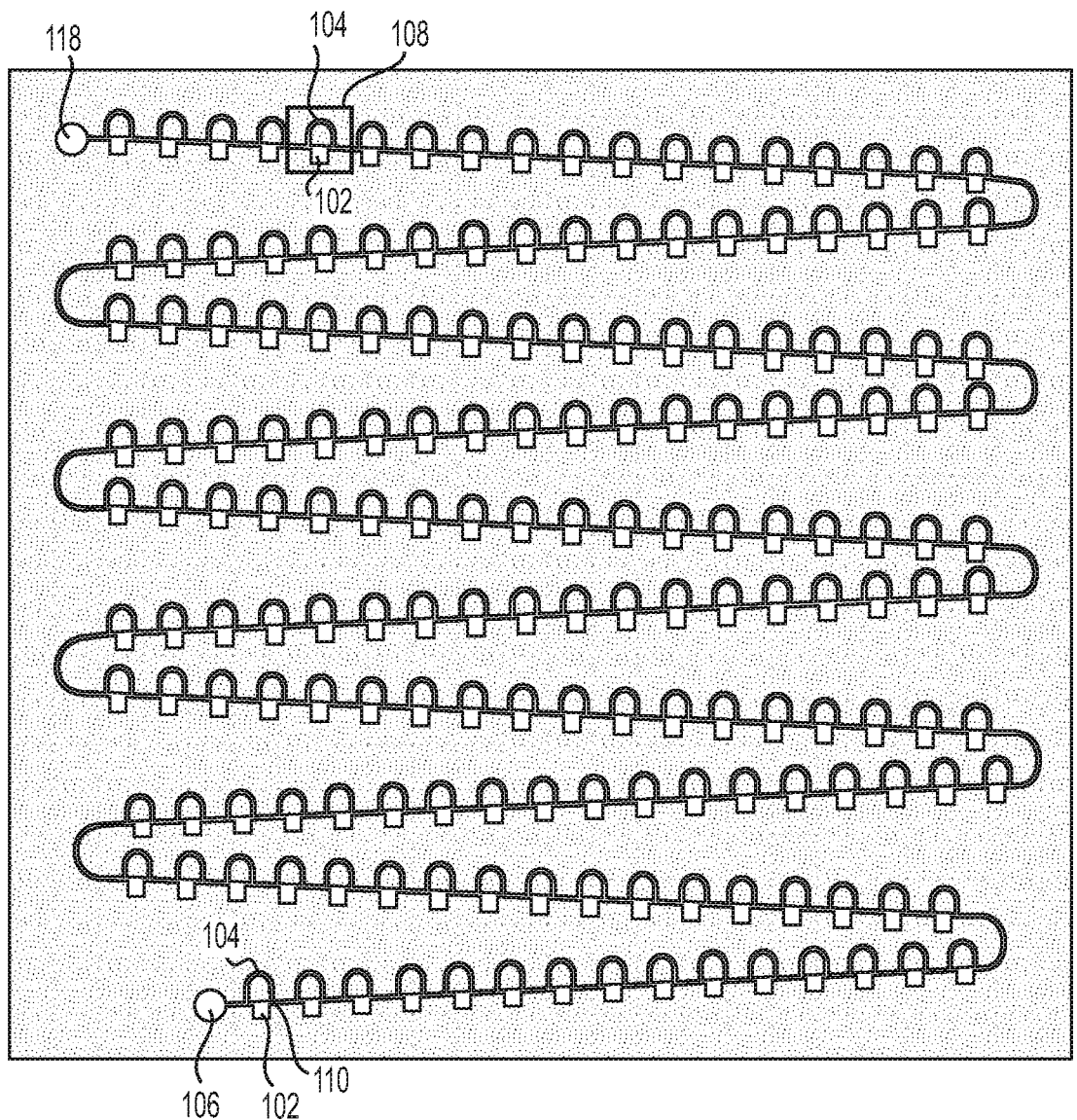

With reference now to FIGS. 1A-D, shown are four hydrophilic embodiments of a microfluidic serial dilution platform based well-plate 100 using an oil-free immiscible phase driven by manual or electronic pipettors. Each embodiment of well-plate 100 includes a network of one or more fluidic traps 102. The drawings shown in FIGS. 1A-1C illustrate only a portion a well-plate and the network of fluidic traps 102 on the well-plate. FIG. 1A shows an embodiment of well-plate 100 with a parallel network of four (4) traps 102 with associated bypass channels 104. In an actual implementation, the well-plate with such network may include multiple repeating networks configured as such. FIG. 1B shows an embodiment of well-plate 100 with a series network of four (4) traps 102 with associated bypass channels 104. In an actual implementation, the well-plate with such network may include multiple repeating networks configured as such. FIG. 1C shows an embodiment of well-plate 100 with a single trap 102 with associated bypass channels 104. In an actual implementation, the well-plate may include repeating single trap networks. FIG. 1D shows an embodiment with 176 traps 102 with associated bypass channels 104 connected in a series network. This last embodiment illustrates that the number of traps can be chosen and configured to meet requirements based on the application. The microfluidic serial dilution platform based well-plate designs shown herein may be situated on a chip or other suitable substrate. The well-plates may be made from, for example, poly dimethyl siloxane (PDMS), cyclic olefin copolymer (COC), poly carbonate (PC), or similar materials.

With continuing reference to FIG. 1A, an embodiment includes a fluidic inlet channel 106 connected to traps 102 and associated bypass channels 104 (each trap 102 and bypass channel 104 together forming a well 108) in parallel arrangement. Fluidic inlet channel 106 includes an interface for pipettor, pipette or other fluid driving mechanism. The embodiment shown further includes main channel 110, including straight channel portion 112, connecting individual wells 108 together in parallel circuit as shown, and hydrophilic capillary constriction channels 114 with, e.g., 40 μm width (small constriction inlet) connecting main channel 110 directly to traps 102. In embodiments, square fluidic traps 102 have, e.g., 1 mm×1 mm sides and bypass channels 104 have, e.g., 200 μm width. In embodiments, main channel extension 116 connects traps 102 to fluidic outlet 118. Each trap 102 is an enclosed chamber with openings where main channel 110 and hydrophilic capillary constriction channels 114 connect with trap 102. Furthermore, while the traps 102 shown in FIGS. 1A-1D are square traps, embodiments may include any variety of shaped traps, including circular or semi-circular traps. Not shown in FIGS. 1A-1D are covers that cover the entire well-plate and the network of fluidic traps 102 on the well-plate (see FIG. 10 for an example of a cover). The cover encloses each trap 102, as well as the various channels, creating the enclosed chamber. In a hydrophilic embodiment, such as describe here with reference to FIGS. 1A-1D the cover is also hydrophilic in nature.

With reference again to FIG. 1B, an embodiment includes fluidic inlet channel 106 with an interface for pipettor, pipette or other fluid driving mechanism, straight channel portion 112 of main channel 110 extending from inlet 106 and, with rest of main channel 110, connecting inlet 106 to fluidic traps 102 and associated bypass channels 104 (together forming a well 108) in a series circuit with each other, and hydrophilic capillary constriction channels 114 with, e.g., 40 μm width (small constriction inlet), connecting main channel 110 directly to traps 102. Bypass channels 104 may be fabricated with a, e.g., 200 μm width, and fluidic traps 102 may be fabricated as square, e.g., 1 mm×1 mm, fluidic traps 102. Embodiment may include enlarged main channel portions 115 to optimize a reduction of air invading into the fluidic trap 102 and main channel extension 116 connecting traps 102 to fluidic outlet 118.

With reference again to FIG. 1C, shown is an embodiment with a fluidic inlet channel 106 with an interface for pipettor, pipette or other fluid driving mechanism, main channel 110 connecting fluidic trap 102 to inlet, hydrophilic capillary constriction channel 114 with, e.g., 40 μm width (small constriction inlet), connecting main channel 110 to trap 102, enlarged channel 115 to minimize invasion of air into the fluidic trap 102, and main channel 110 connecting well or trap 102 to fluidic outlet 118.

With reference again to FIG. 1D, shown is 176 fluidic traps 102 connected in series from fluidic inlet 106 to fluidic outlet 118. As above, each trap 102 and bypass channel 104 together form well 108 and adjacent trap 102 and bypass channel 104 combinations are connected by main channel 110 and various portions or extensions thereof.

Figure 1E:
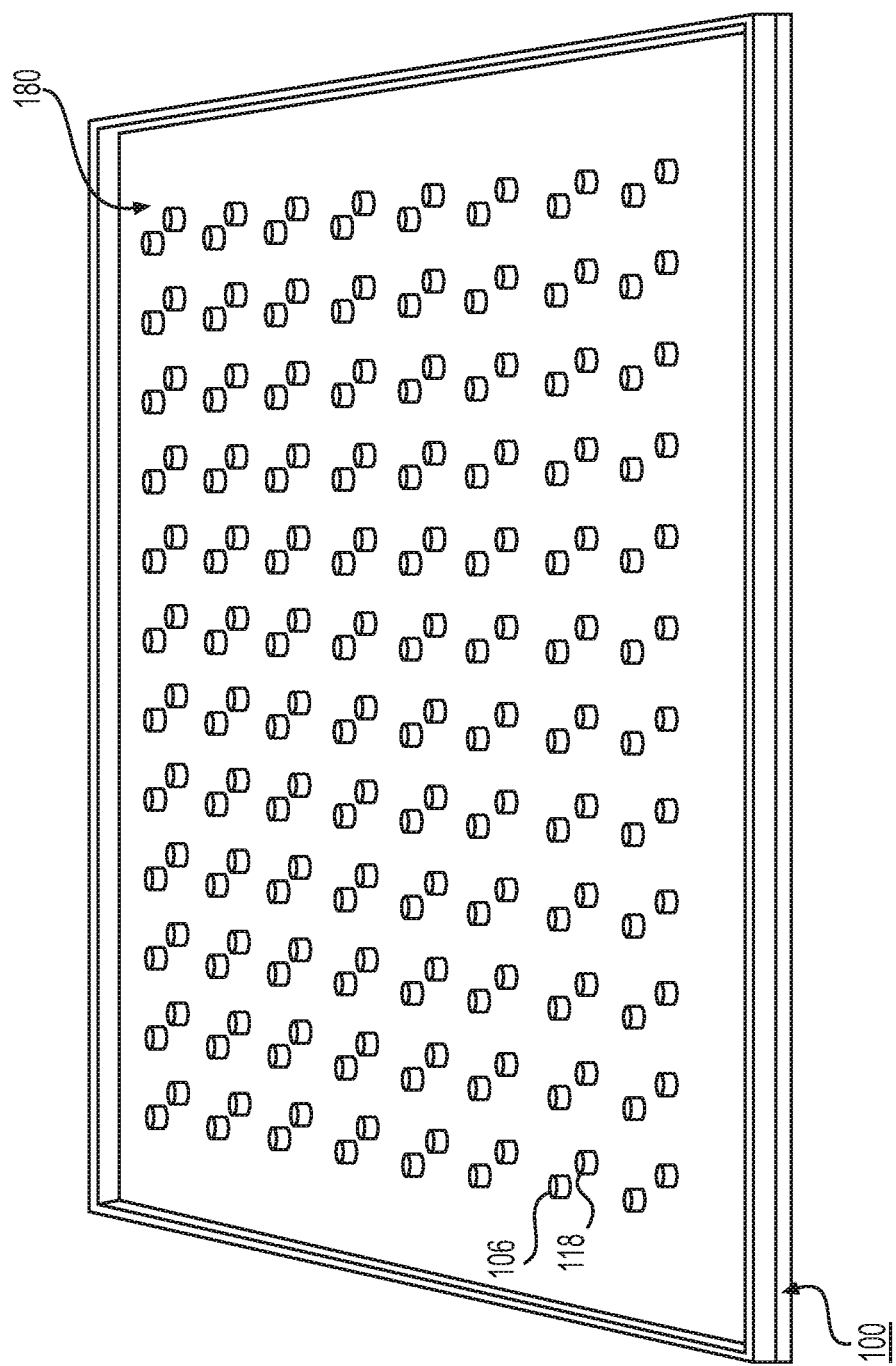
FIG. 1E is a diagram illustrating an entire well-plate, with cover, that includes an embodiment of a microfluidic serial dilution platform using an oil-free immiscible phase driven by manual or electronic pipettors

With reference now to FIG. 1E, shown is an entire well-plate 100 with a uniform network of ninety-six fluidic traps. Visible is cover 180, fluidic inlets 106 and fluidic outlets 118 for each fluidic trap network. Fluidic inlets 106 and fluidic outlets 118 extend through cover 180.

Figure 2A:
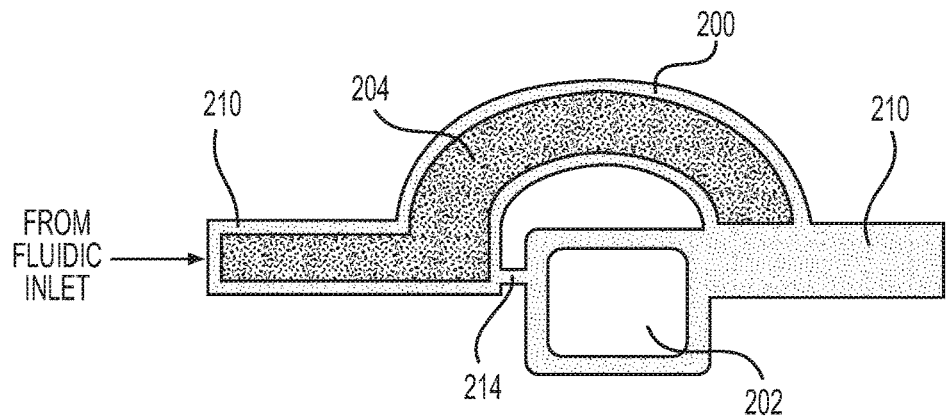
FIGS. 2A-2C are diagrams illustrating a hydrophilic operation of a hydrophilic embodiment of the microfluidic serial dilution platform based well-plate using an oil-free immiscible phase driven by manual or electronic pipettors, particularly a fluid trapping process of the operation.
Figure 2B:
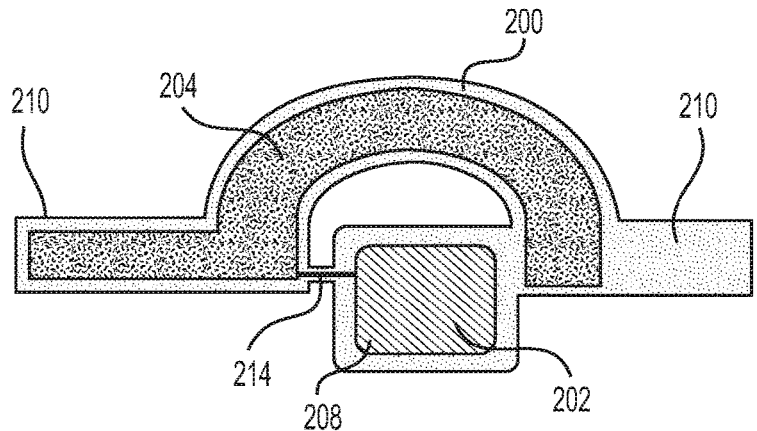
Figure 2C:
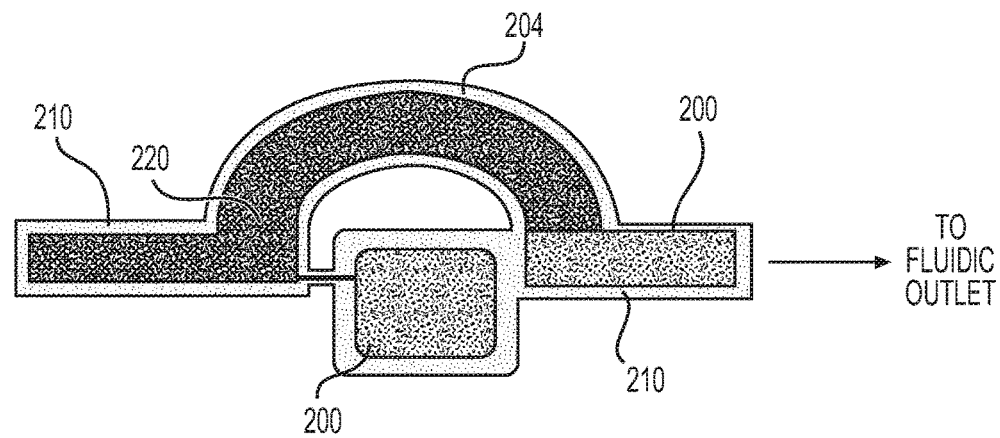

With reference now to FIGS. 2A-2C shown are schematic diagrams illustrating a fluid trapping process using embodiments of a microfluidic serial dilution platform based well-plate using an oil-free immiscible phase driven by manual or electronic pipettors. Shown in FIG. 2A, fluid 200 first enters the bypass channel 204, through main channel 210 from direction of fluidic inlet (not shown), enhancing or increasing the hydrodynamic resistance in the bypass channel 204, and stops at the larger constriction of the main channel 210 and unfilled fluidic square trap 202. Also shown in FIG. 2A is unfilled hydrophilic capillary constriction channel 214.

With reference now to FIG. 2B, fluid 200 is shown now filling the fluidic square trap 202 through the smaller constriction (hydrophilic capillary constriction channel 214) connected upstream to square trap 202. Fluid 200 in bypass channel 204 now stops at mouth of the trap 202.

With reference now to FIG. 2C, air 220 is then passed through the network of fluidic traps 202. The air 220 passes through bypass channel 204, removing remaining excess fluid 200 from the bypass channel 204 into main channel 210 and leaving a fragmented droplet of fluid 200 trapped in the hydrodynamic trap 202. Air 220 will continue to pass through main channel 210 to next well (not shown), removing excess fluid 200 from bypass channel of next well, and so on through network of traps 202 towards fluidic outlet (now shown).

Figure 3:
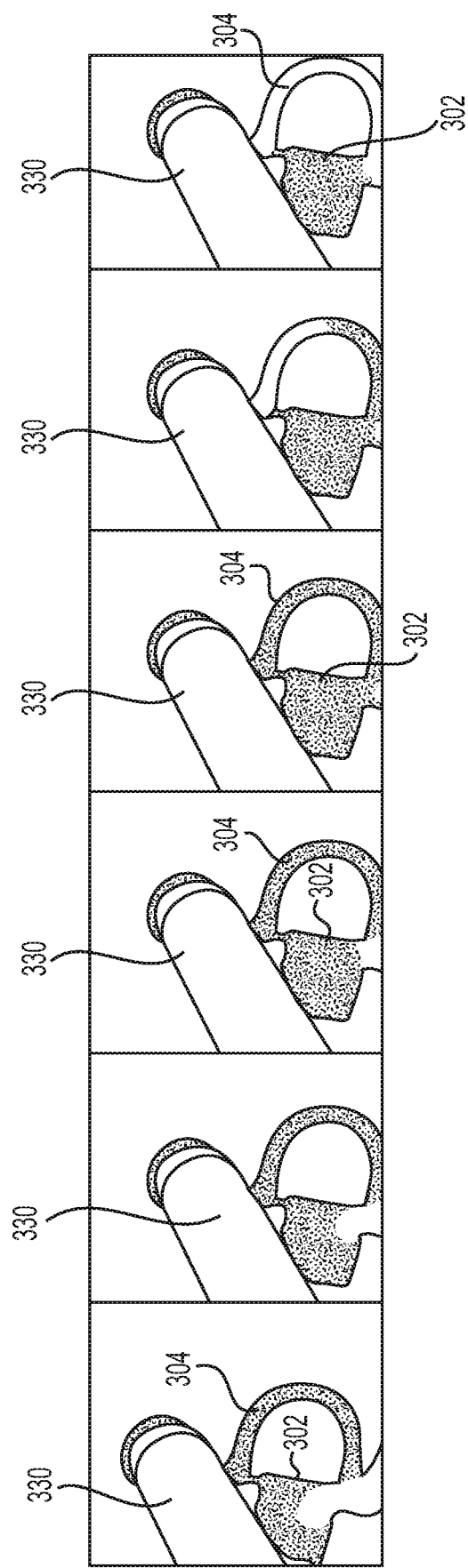
FIG. 3 is a series of images illustrating the fluid trapping process of an embodiment of the microfluidic serial dilution platform based well-plate using an oil-free immiscible phase driven by manual or electronic pipettors.

With reference now to FIG. 3, shown are a series of images illustrating the trapping process described above and illustrated in FIGS. 2A-2C. With reference to FIG. 3, shown are a series of micrograph images 1-6 of the series of events that leads to the fragmentation of the long fluid slug and the trapping of fluid in the square trap. Pipettor 330 connected to fluidic inlet channel (e.g., see fluidic inlet channel 106 in FIGS. 1A-D) with an interface for pipettor 330, pipette or other fluid driving mechanism is shown in these images.

With reference now to FIGS. 4A-D, shown are schematic diagrams illustrating a serial dilution process using an embodiment of microfluidic serial dilution platform based well-plate using an oil-free immiscible phase driven by manual or electronic pipettors. Steps shown in FIGS. 4A-4D take place after the fluid trapping process described above. Together, the fluid trapping process and serial dilution process, shown in FIGS. 2A-2C and 4A-4D, comprise a significant portion of the operation of the microfluidic serial dilution platform based well-plate using an oil-free immiscible phase driven by manual or electronic pipettors.

Figure 4A:
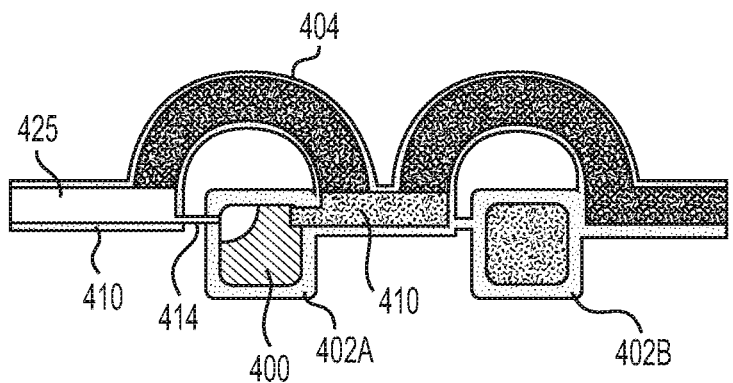
FIGS. 4A-4D are diagrams illustrating a hydrophilic operation of a hydrophilic embodiment of the microfluidic serial dilution platform based well-plate using an oil-free immiscible phase driven by manual or electronic pipettors, particularly a serial dilution process of the operation.

With reference to FIG. 4A, diluting stream or fluid (white) 425 first displaces air 420 and enters the main channel 410, then enters the constriction (hydrophilic capillary constriction channel) 414 upstream of the network, invading a part of a first fluid-filled trap 402A, diluting the fluid 400 in the trap 402. Fluid 400 is ejected from the trap 402A into the main channel 410 due to the displacement of fluid 400 from the trap 402A by the diluting fluid 425. The portion of fluid 400 that exited the first trap 402A now enters the second trap 402B and causes a portion of fluid 400 to leave the second trap 402B.

Figure 4B:
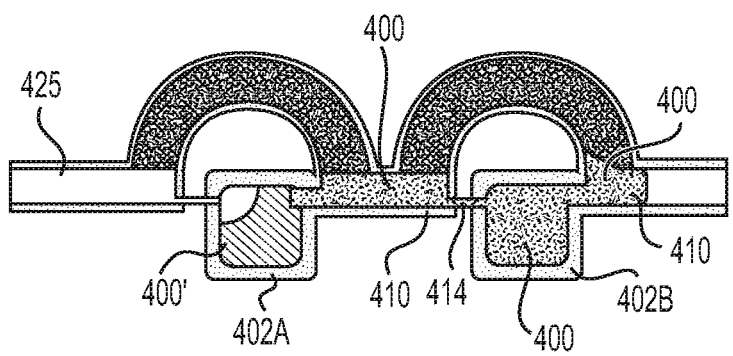

With reference to FIG. 4B, shown is trap 402A filled with diluted fluid 400', ejected fluid 400 in main channel 410, ejected fluid 400 from first trap 402A that has entered second trap 402B, connected in series, through hydrophilic capillary constriction channel 414 of second trap 402B, and fluid ejected from second trap 402B into main channel 410. As an increasing amount of diluting fluid 425 enters the upper section of the first trap 402A a portion of the diluting stream 425 now enters the second trap 402B and a series of micro-droplets are formed that enter successive traps causing a serial dilution.

Figure 4C:
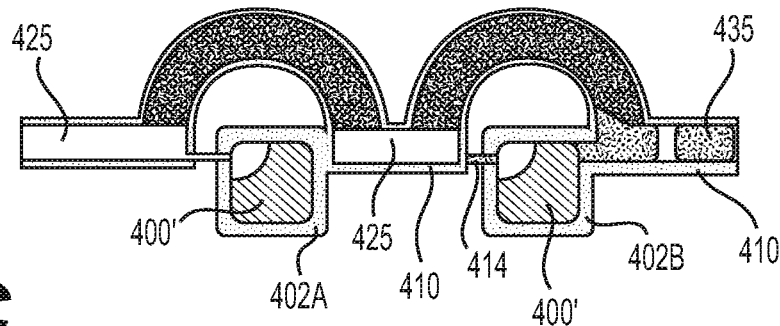

With reference to FIG. 4C, shown is diluted fluid 400' in first trap 402A, diluting fluid 425 filling upper section of first trap 402A and entering second trap 402B, diluting fluid 425 filing capillary section 414 of the second trap 402B, and as air is injected into device following the diluting plug, causing fluidic droplets 435 in air phase to form. As air is pumped into the channel 410 following the diluting stream, excess diluting fluid 425 is carried away from the channel into the outlet.

Figure 4D:
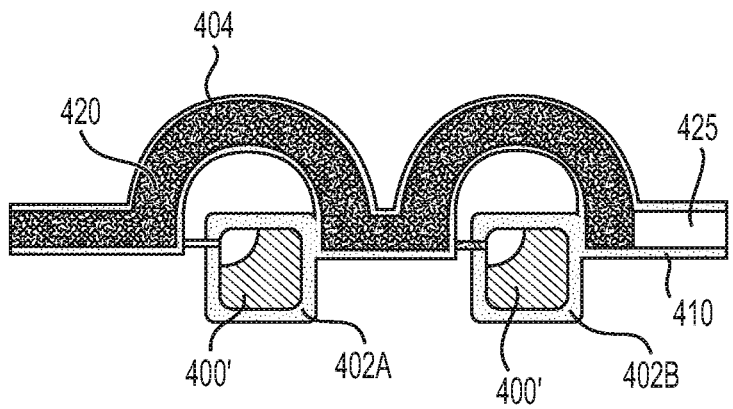

With reference to FIG. 4D, shown is air-filled bypass channel 404 as air 420 is driven into bypass channels 404 after the diluting plug, the diluted fluid 400' in first trap 402A, the diluted fluid 400' in second trap 402B and main channel 410 with excess fluid 425 flushed out with air phase.

Figure 5:
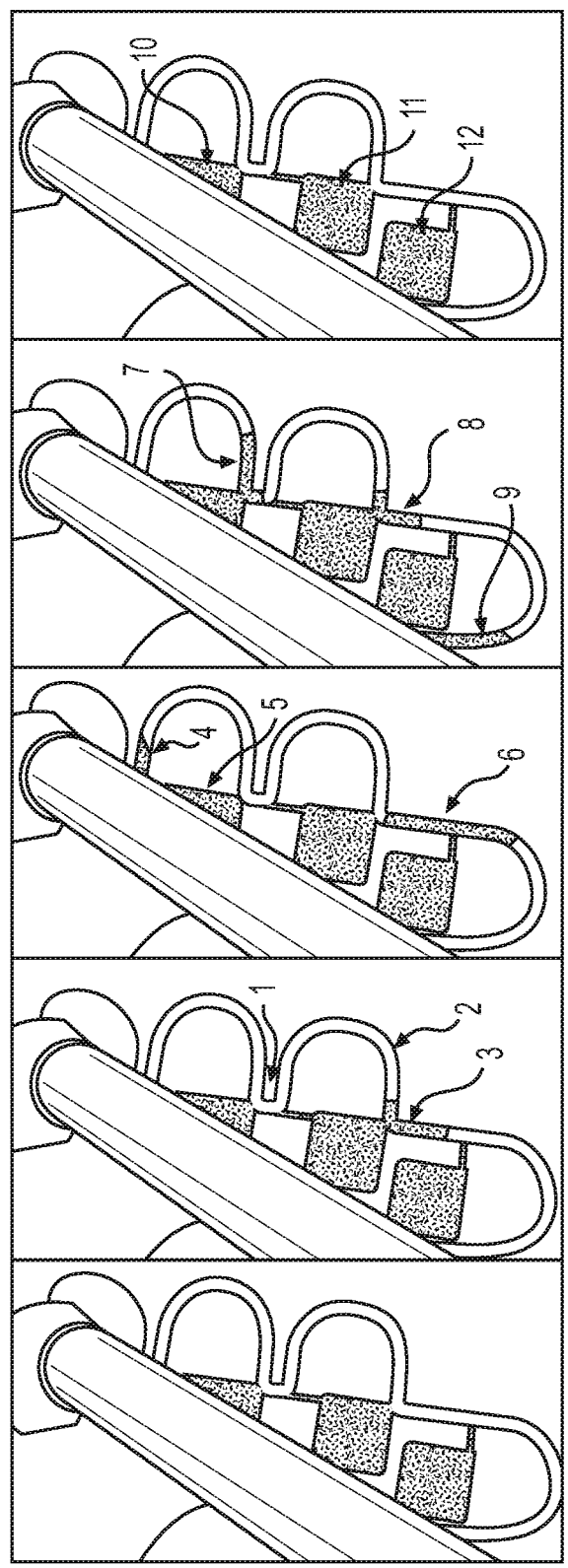
FIG. 5 is a series of images illustrating the serial dilution process of an embodiment of the microfluidic serial dilution platform based well-plate using an oil-free immiscible phase driven by manual or electronic pipettors.

With reference now to FIG. 5 shown are a series of images illustrating the serial dilution process described above with reference FIGS. 4A-4D. Shown in FIG. 5, are five (5) micrograph images of the series of events that leads to serial dilution of the trapped droplets. In image 2, ejected fluid from first trap enters 1 second trap connected in series, bypass channel 2 is filled with air, and fluid is ejected 3 from second trap. In image 3, diluting fluid enters 4 capillary section of first trap, fluid in first trap 5 is now diluted, ejected fluid from second trap forms a fluid drop 6 in air phase. In image 4, diluting fluid fills upper section of first trap 7 and is subsequently ejected, diluting fluid fills upper section of second trap 8 and is ejected from second trap into main channel and ejected micro-droplet 9 from second trap is shown in main channel. In image 5, first trap 10 has the highest amount of diluting fluid, second trap 11 has a comparatively lower amount of diluting fluid compared to first trap and a third trap 12 has the lowest amount of diluting fluid compared to first trap and second trap.

Embodiments enable dilution of different magnitudes carried out in a trapping network. For example, embodiments enable cell cultures to be carried out in the traps, such as breast cancer cells cultures in a matrigel environment in the traps. Embodiments provide a new method for the trapping and dilution of nano to pico liter droplets stored in microfluidic networks. By using a novel design and employing hydrophilic square channels the fluid is pumped in through capillary action and the applied pressure drop of a pipettor. The fluid is driven into the channel in the direction where the smaller constriction of the trap is upstream (as opposed to the conventional system where fluid enters the trap through the larger constriction). The fluidic slug then fills the entire trap by flowing through this constriction (see FIGS. 2 and 3). Consecutive traps in the network are also filled in this manner. Air is then used as the immiscible phase to fragment the long fluidic slug and remove excess fluid contained in the bypass channels.

Consequently, the method utilized by embodiments described herein do not require an immiscible oil phase which can cause adverse results in some applications, although if required an immiscible oil phase can also be used to fragment the fluidic slug in the trap by flowing it through the network at a lower pre-defined flow rate.

Embodiments of the method utilized by embodiments described herein allows for the slug to be trapped and fragmented using larger pressure drops (which are typical for off-the shelf pipetting systems) compared to currently available solutions that require optimization of flow rates or additional external pumping systems (such as syringe pumps).

Embodiments also dilute fluids stored in the traps using a novel dilution method that produces fluidic drops in-air, in-situ in the device. This method with optimization can prevent cross-contamination between compositions of fluids in the various stationary traps. Embodiments of the device described herein can also be used for the three-dimensional culture of cells in the hydrodynamic traps using an appropriate polymer matrix. These cultured cells can then be serially diluted and screened against drugs in an HTS fashion.

In embodiments described herein, a hydrophilic channel microfluidic based network with square (or other shaped) storage traps (see FIGS. 1A-1D) to store and dilute nanoliter droplets. These droplets are produced in-situ in these square traps by flowing a fluidic slug through the fluidic network in a direction where with the smaller capillary junction is upstream of the large entrance channel at the traps. This injection of fluid into the channels is achieved at high flow rates using a commercially available pipetting system. This is followed by fragmenting the long slug of fluid using an immiscible air-phase that removes excess fluid from the channels causing nano to pico liter droplets of fluid to be contained in the square traps (see FIGS. 2 and 3). The need for an immiscible oil-phase is, therefore, completely eliminated.

Embodiments of the method for dilution causes the diluting stream to directly enter into part of the square (or other shaped) trap (amount can be varied based on volume, size of trap and flow rate of the diluting stream) (see FIGS. 4 and 5).

The injection of the diluting stream into the trap causes part of the reagent in the trap to be displaced, which in turn causes the formation of a fluid droplet in the air filled channels (see FIG. 4). This droplet then enters the second trap (where composition is the same as first trap) and causes another fluid-air drop to be produced (see FIG. 5). This mechanism, therefore, can produce serial dilutions without causing contamination of the diluting stream or of the reagents in the traps downstream. Both the trapping and serial dilution of the droplets in the device are performed using conventional pipetting systems without the need for precise fluid control or lower flow rates.

In another embodiment, only the cover of the microfluidic structure is chosen to be hydrophilic in nature. With reference now to FIGS. 6A-6B, shown are schematic diagrams that illustrate trapping using this such an embodiment. These diagrams again illustrate only a portion of a well-plate and a portion of the network of traps on the well-plate. The fluid is first trapped by injecting it into the channel towards the larger mouth of the hydrodynamic trap that is filled initially with air. The channels are hydrophobic while the base cover used to enclose these channels is hydrophilic in nature. The fluidic slug fills the trap while not entering the hydrophobic capillary section that has a larger hydrodynamic resistance than the fluidic trap and is filled with air. This capillary section filled with air, therefore, acting as an air valve. Once the trap is completely filled, the hydrodynamic resistance of the trap is enhanced and excess fluid from the trap then moves into the bypass channel. This fluid subsequently enters other traps in the network and fills them in the same method as described previously.

The fluids that are filled in these traps can then be diluted by coalescence between the diluting and trapped fluid. See for example US Patent No. WO2012154688 A2. This is depicted in FIG. 6B.

With reference again to FIG. 6A, shown is an outlet for fluid 618, fluid filled first hydrodynamic trap 602, bypass channel of fluidic network 604, capillary section of hydrodynamic trap filled with air 614, inlet for fluid driven by pipette or other fluid driving mechanism 606, structure of the fluidic network that is hydrophobic in nature and base 650 of the fluidic network, that is used to cover the hydrophobic structure, which is hydrophilic in nature.

With reference again to FIG. 6B, shown is an outlet for fluid 618, diluted filled first hydrodynamic trap 602, diluting fluid injected from the inlet 606, diluting fluid coalescing with fluid trapped in hydrodynamic trap 602, inlet for fluid driven by pipette or other fluid driving mechanism 606, structure of the fluidic network that is hydrophobic in nature and hydrophillic base 650 of the fluidic network that is used to cover the microfluidic hydrophobic structure. Note, the various features described herein with reference to the hydrophilic embodiments (see FIGS. 1A-5, 10A-10B) may be incorporated into the hydrophobic embodiment described in FIGS. 6A-6B.

Figure 7A:
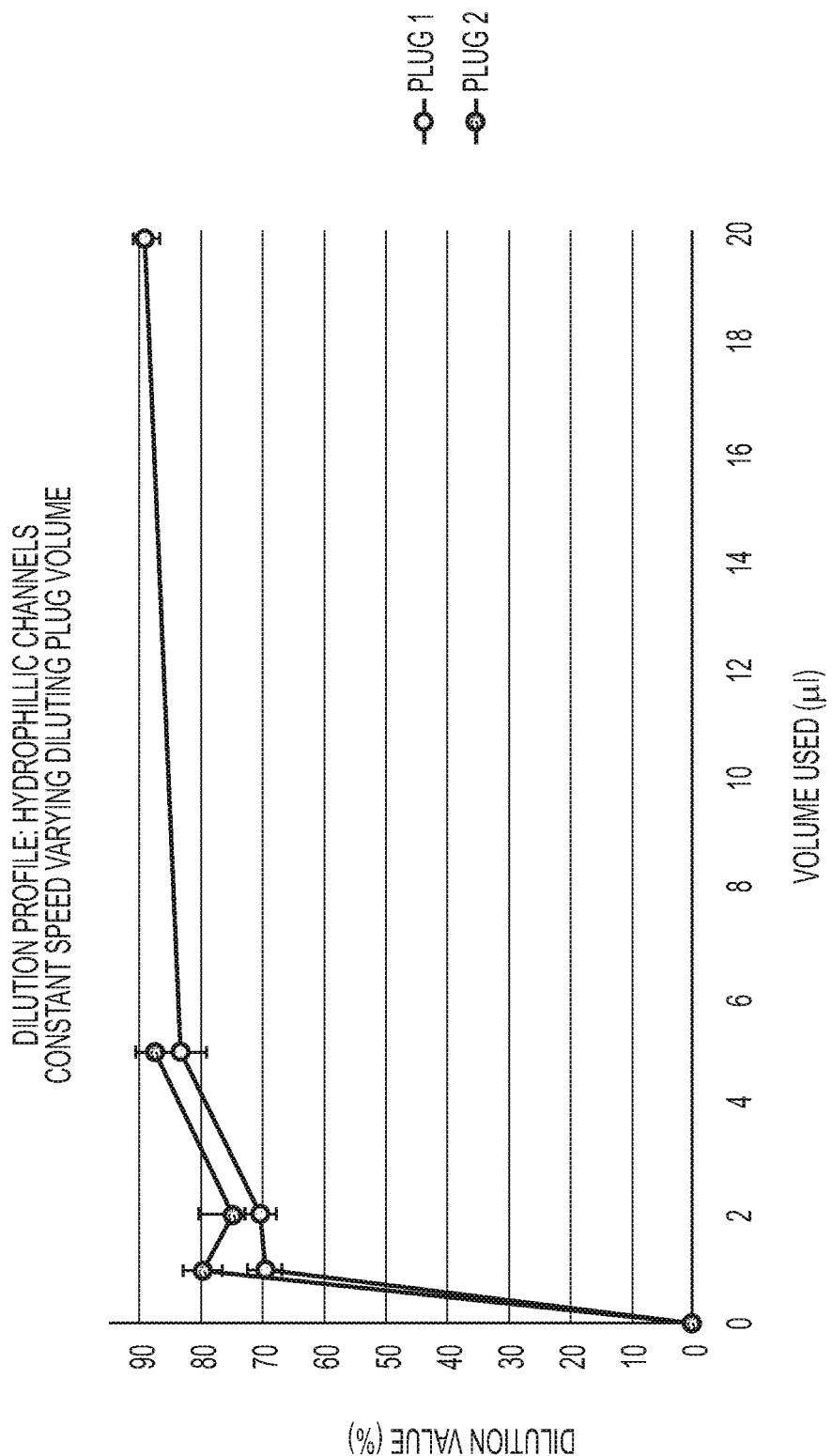
FIGS. 7A-7C are graphs illustrating data from dilutions using a hydrophilic embodiment of the microfluidic serial dilution platform based well-plate using an oil-free immiscible phase driven by manual or electronic pipettors.
Figure 7B:
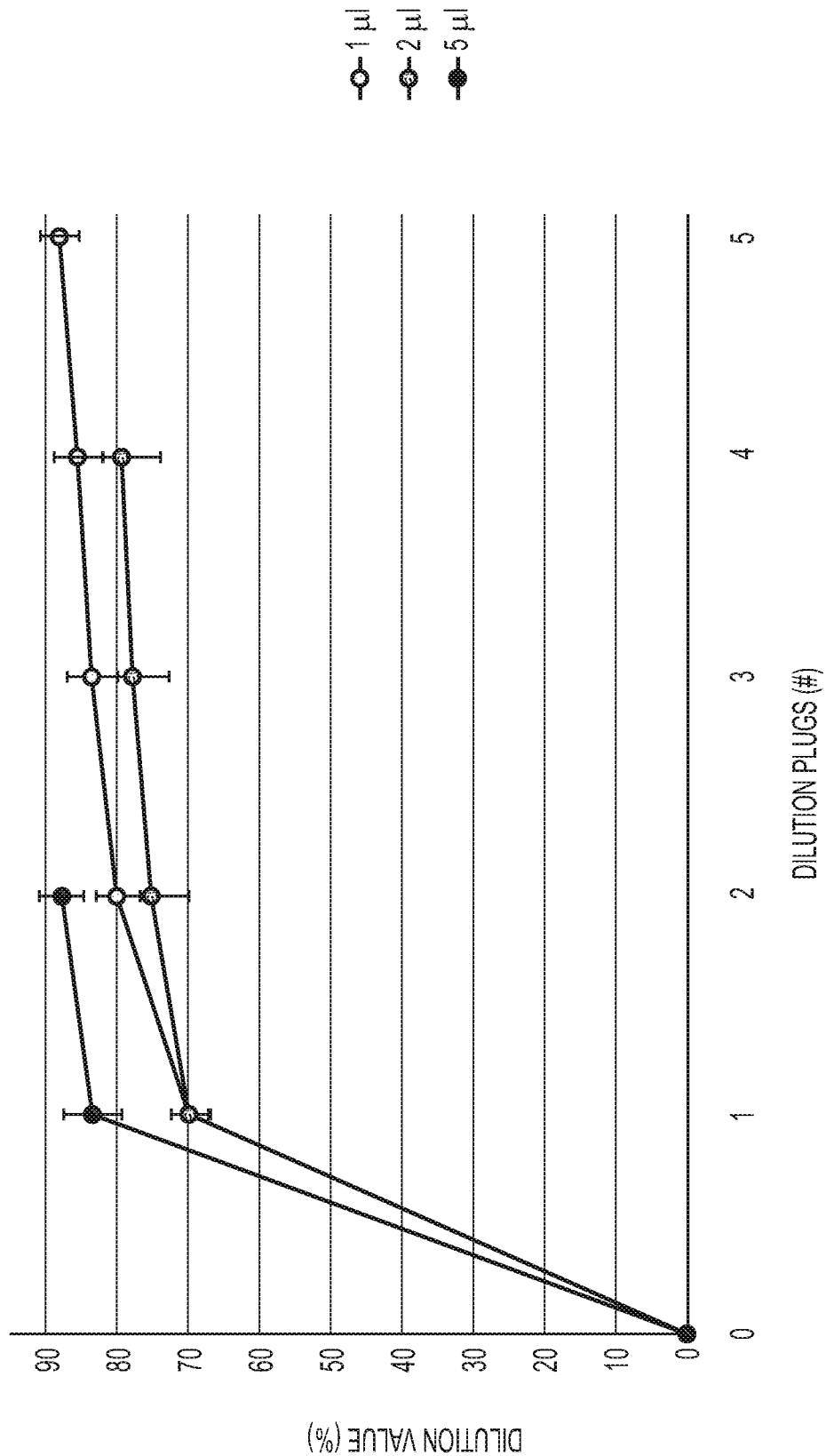
Figure 7C:
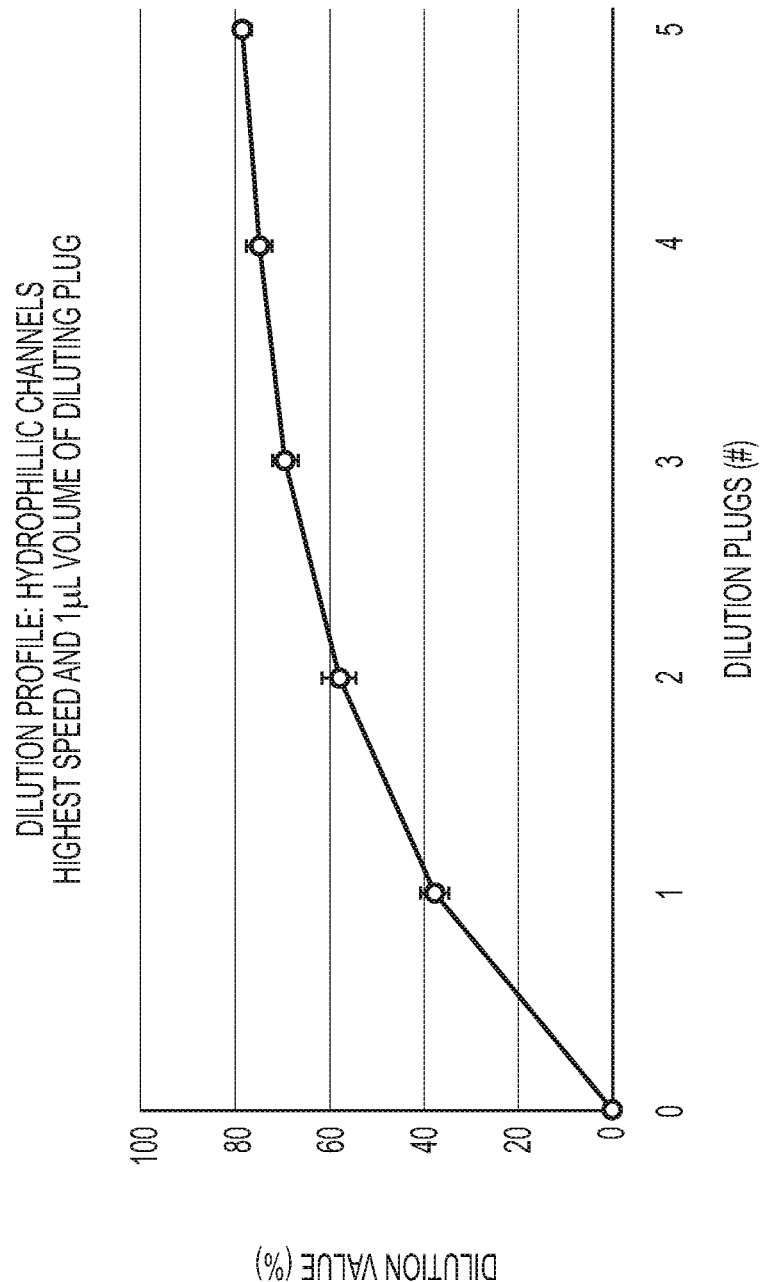

With reference now to FIGS. 7A-7C, shown are graphs illustrating data from dilutions carried out in the hydrophilic design of FIG. 1C using a Matrix™ sixteen (16) channel electronic pipettor from Thermofisher Scientific. The amount of dilution in the microfluidic chambers can be varied by varying either: (a) the volume of the diluting fluid stream, with the results shown in FIG. 7A; (b) the number of diluting plugs, with the results shown in FIGS. 7B and 7C. As can be seen from the graphs, the co-efficient of variation (CV) of the dilution is typically ≤5%.

Figure 8A:
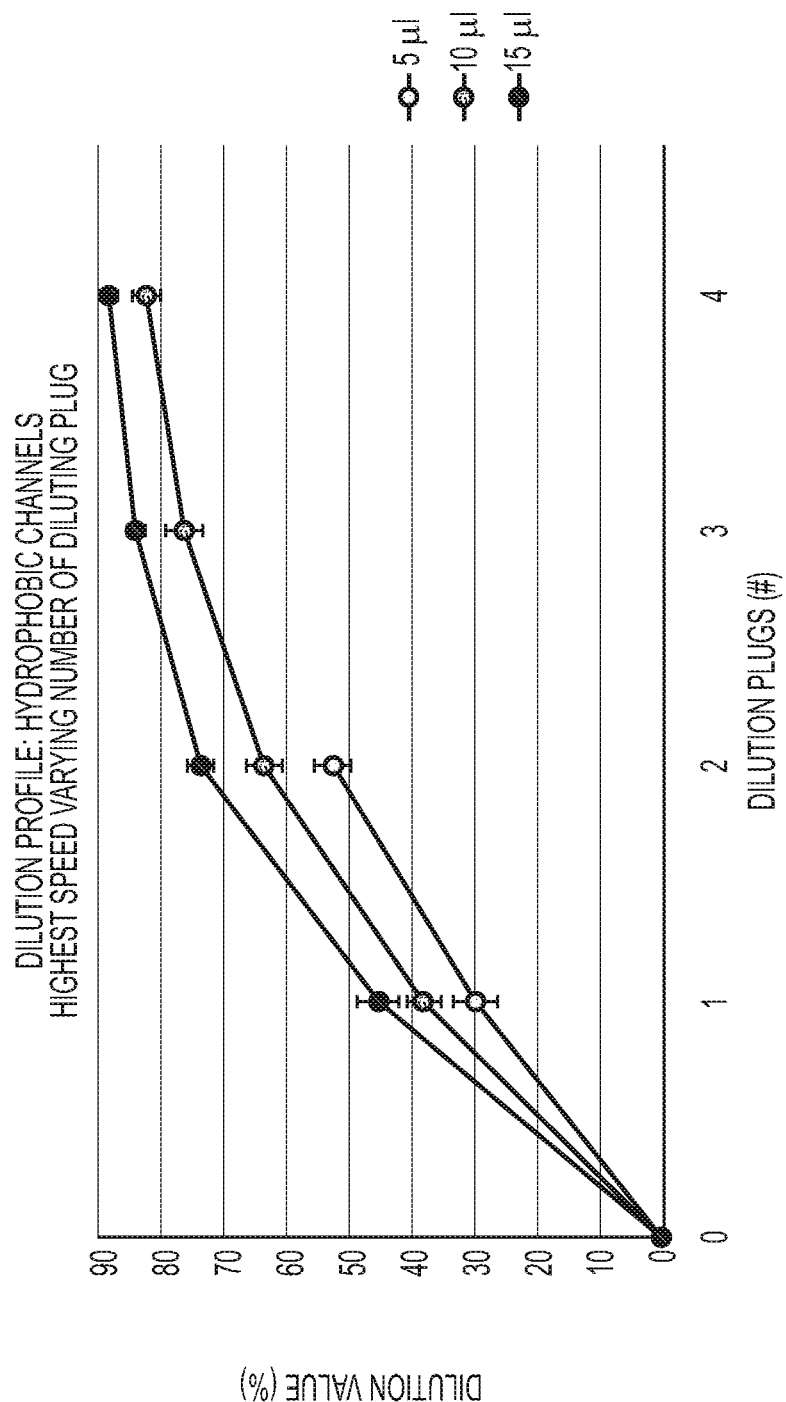
FIGS. 8A-8B are graphs illustrating data from dilutions using a hydrophobic embodiment of the microfluidic serial dilution platform based well-plate using an oil-free immiscible phase driven by manual or electronic pipettors.
Figure 8B:
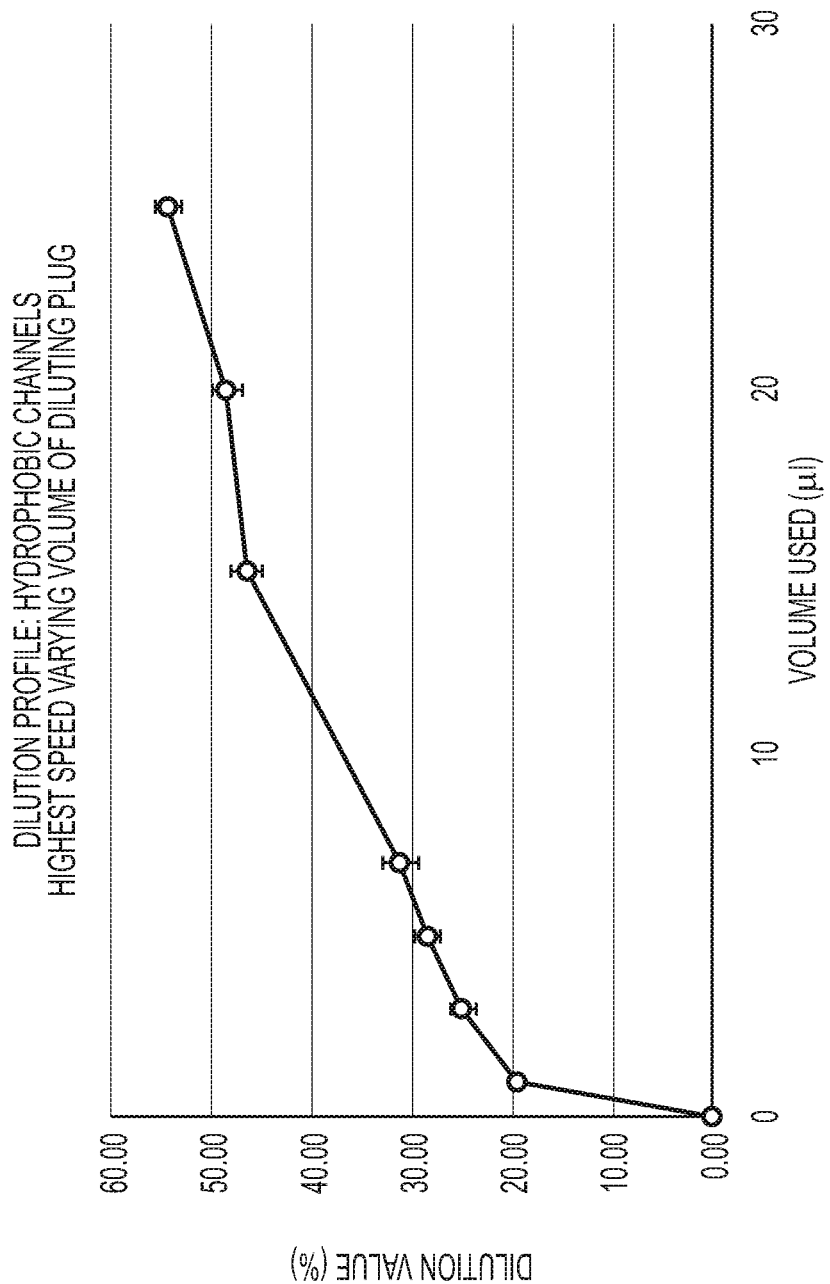

With reference now to FIGS. 8A-8B, shown are graphs illustrating data from dilutions carried out in a hydrophobic design of FIG. 1C using a Matrix™ sixteen (16) channel electronic pipettor from Thermofisher Scientific. The graph in FIG. 8A illustrates the varying amount of dilutions that can be accomplished using varying volumes of diluting plugs and varying numbers of such diluting plugs. The graph in FIG. 8B illustrates the varying amounts of dilutions that can be accomplished using varying volumes of diluting plugs.

Figure 9B:
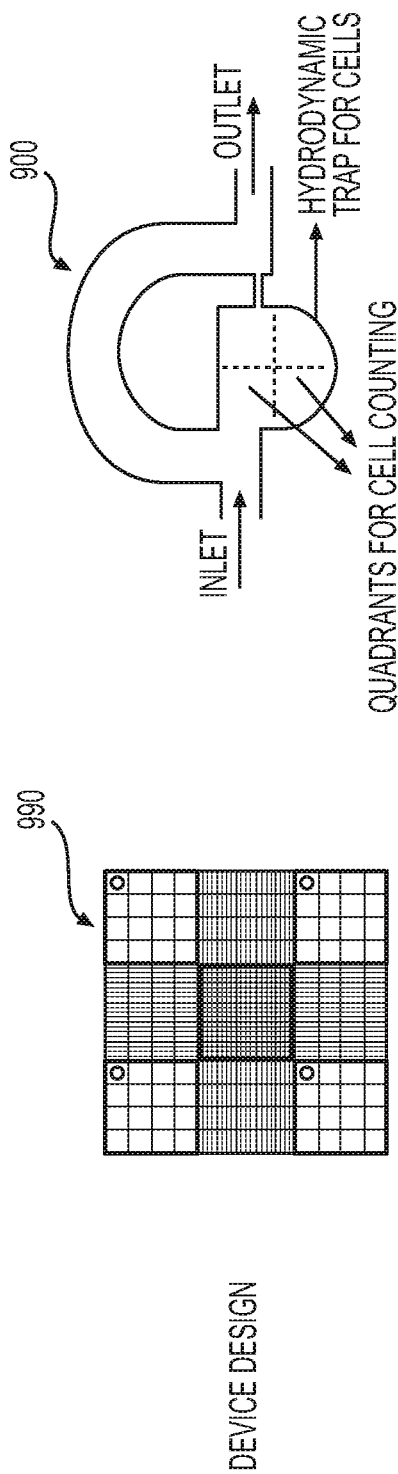
FIG. 9B is a diagram illustrating a hydrophobic embodiment of the microfluidic serial dilution platform based well-plate using an oil-free immiscible phase driven by manual or electronic pipettors used a hemocytometer.

With reference to FIGS. 9A-9C, tables and diagrams are shown illustrating the embodiments of a microfluidic serial dilution platform based well-plate that may also be used as a hemocytometer. The embodiment shown is a hydrophobic design (e.g., see FIGS. 6A-6B). With reference to FIG. 9A, a table is shown illustrating cell counts made with a standard hemocytometer as well as an embodiment of a microfluidic serial dilution platform based well-plate. The table illustrates two cell counting experiments: (1) an experiment performed with a standard hemocytometer diluted with trypan blue, a dye used to determine between live/dead cells, and a microfluidic serial dilution platform based well-plate without dilution by trypan blue and (2) an experiment performed with a standard hemocytometer diluted with trypan blue and a microfluidic serial dilution platform based well-plate with dilution by trypan blue. The cell counting formula used is a common protocol associated when using a hemocytometer, where the cell count is multiplied by both the dilution factor and the conversion factor. With reference to FIG. 9B, a hydrophobic implementation of a microfluidic serial dilution platform based well-plate 900 with traps gridded into quadrants each for cell counting. A depiction of a standard gridded hemocytometer 990 is also shown.

A cell suspension may be loaded using either a manual or electronic pipette into a gridded microfluidic trap. The cells within the traps were counted and used to calculate the total population. In the first experiment, the cell count using a standard hemocytometer with trypan blue took six minutes and twenty-two seconds (6:22) and produced counts of 180, 182, 225, and 83 totaling to 670. Applying the conversion factor, the count became 670 $e^4$ which is the same as $6.7 \times 10^6$ cells/ml. Including the entire suspension volume, the total count from the standard gridded hemocytometer resulted in $20.1 \times 10^6$ total cells. The count using an implementation of microfluidic serial dilution platform based well-plate 900 with traps gridded into quadrants took only thirty seconds (0:30). Within six traps, the quadrants totaled to 681, 659, 667, 610, 641, and 734, producing an average of 665 cells/0.1 µl, which converts to 6653 cells/µl, equaling $6.65 \times 10^6$ cells/ml. With the same suspension volume, this method calculated to a total of $19.9 \times 10^6$ cells. The results for the second experiment were obtained using the same methods and produced values that were equally close.

A comparison of results obtained from the implementation of a microfluidic serial dilution platform based well-plate and those obtained using a conventional hemocytometer shows reasonably similar cell counts. The microfluidic serial dilution platform based well-plate shows excellent reproducibility and presents further advantages over conventionally used hemocytometers one such being the time required, as illustrated in FIG. 9C.

Experiments with embodiments described herein demonstrate that microfluidic serial dilution platform based well-plate may perform various assays completely on-chip (i.e., on a chip or other suitable substrate containing (how many traps within a given chip. For example, experiments showed Clenbuterol ELISA assays may be performed completely on-chip using an electronic pipette. In an experiment, the varying degrees of dilution of the sample using the buffer and substrate solutions were accomplished using the graphs for dilution presented in FIGS. 7A-7C and FIGS. 8A-8B. Microscopic images of the experiments demonstrated that the samples with most amount of drug had no coloration where samples with the least amount of drug below the threshold value have higher values of coloration as expected. Advantages of using ELISA-based assays with embodiments of the present invention include: (a) reduced time to conduct tests (nearly one-third the time compared to conventional methods; (b) higher sensitivity due to an increased surface to volume ratio; and (c) increased accuracy due to a conserved volume that does not change.

Figure 10A:
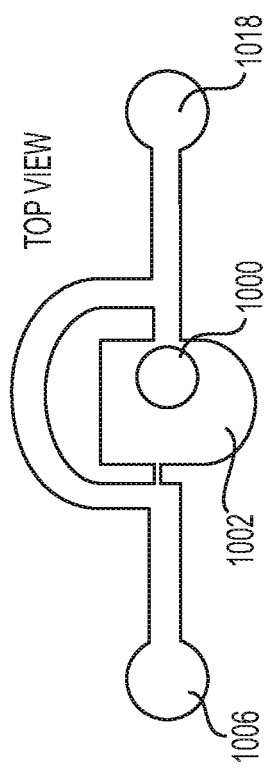
FIGS. 10A and 10B are diagrams illustrating an embodiment of a microfluidic serial dilution platform based well-plate using an oil-free immiscible phase driven by manual or electronic pipettors with a cover on top of the well-plate to maintain humidity and control evaporation from the fluidic trap.
Figure 10B:
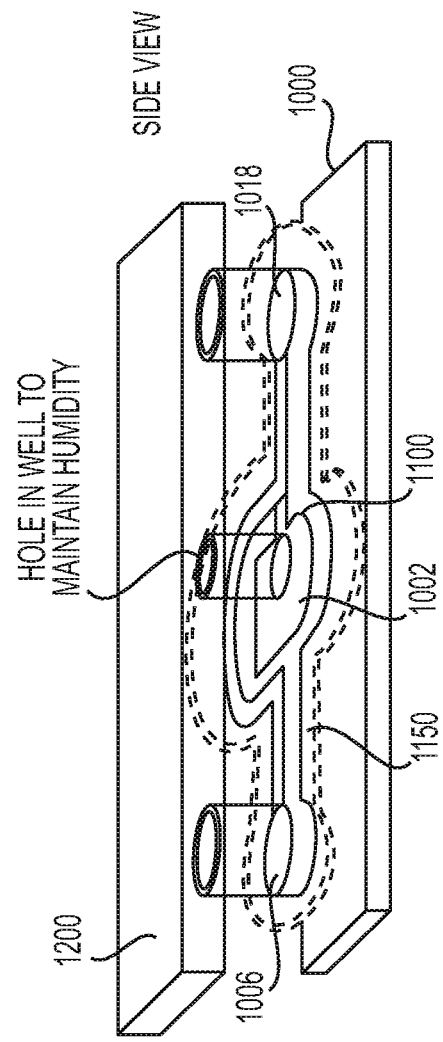
Figure 10C:
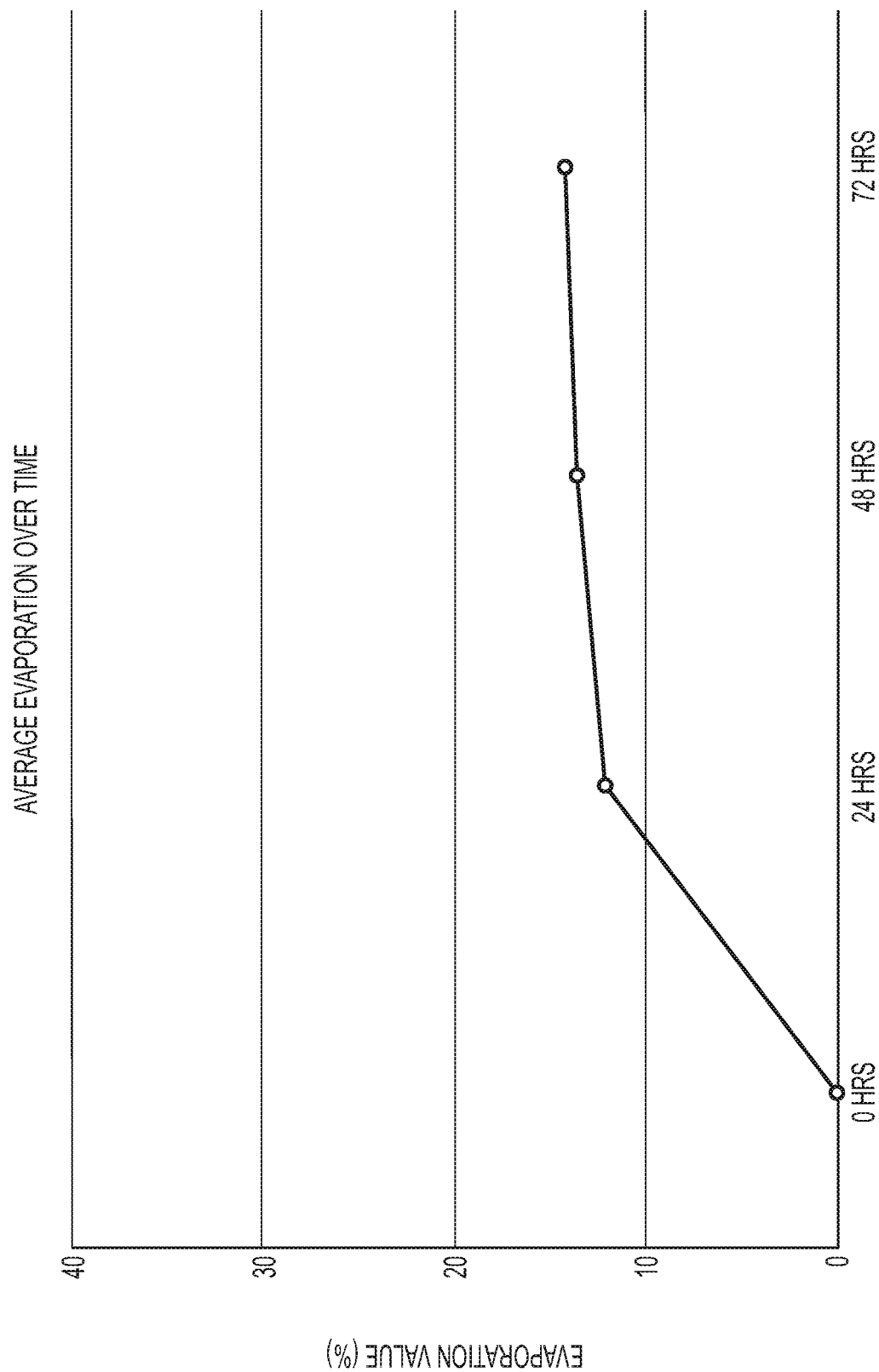
FIG. 10C is a graph illustrating average evaporation rates using the embodiment shown in FIGS. 10A and 10B

With reference now to FIGS. 10A-C, shown is an embodiment of microfluidic serial dilution platform based well-plate that controls the evaporation of fluid from the fluidic traps. If evaporation of fluid from the traps needs to be controlled as is the case when performing cell based assays the device is configured as shown. With reference to FIG. 10A, shown is a top view of this configuration which includes a hole 1100 drilled into each trap 1002 of the microfluidic network (specifically, hole 1100 is drilled through cover enclosing trap 1002). In this manner, trap 1002 is not fully enclosed by cover. However, this hole 1100 is covered at all times while microfluidic serial dilution platform based well-plate is in use by a material different than the cover. As discussed above, each trap in the microfluidic trap network is covered by cover (e.g., cover 1200) while hole 1100, which extends through cover, is covered by cellophane or similar material that is airtight. The covered hole maintains humidity in the trap to prevent evaporation of fluid in the trap. Note: the fluidic trap 1002 shown in FIG. 10A is not square; rather trap 1002 has a rounded or semi-circular bottom. With reference to FIG. 10B, shown is a perspective view of this embodiment of microfluidic serial dilution platform based well-plate 1000. A reservoir 1150, situated on well-plate 1000 and filled with fluid, such as water, at a fixed pressure, surrounds the microfluidic network. After the trap 1002 is filled with fluid, e.g., a cell solution, a cover 1200 is placed over the microfluidic serial dilution platform based well-plate covering the inlet 1006, outlet 1018, the hole 1100 and the reservoir 1150 (note cover 1200 is shown in suspended above microfluidic serial dilution platform based well-plate; in use, it would be directly in contact and actually cover microfluidic network). With reference to FIG. 10C, shown is a graph depicting the amount of evaporation in the well after various time points using the embodiment illustrated in FIGS. 10A-B. As can be seen the maximum evaporation is less than fifteen percent (15%) after a time period of seventy-two (72) hrs.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A microfluidic serial dilution platform based well-plate, comprising:
    a plurality of fluidic traps;
    a plurality of hydrophilic capillary constriction channels;
    a plurality of bypass channels, wherein each of the plurality of bypass channels is associated with one of the plurality of fluidic traps, each of the plurality of hydrophilic capillary constriction channels is associated with one of the plurality of fluidic traps, and each of the plurality of fluidic traps is associated with one of the plurality of bypass channels and one of the plurality of hydrophilic capillary constriction channels, wherein each fluidic trap and the associated bypass channel are connected in parallel and each fluidic trap and the associated hydrophilic capillary constriction channel are connected in series, each fluidic trap has a larger width than the associated bypass channel to trap fluid in said each fluidic trap while the fluid is removed from the associated bypass channel, and each of the hydrophilic capillary constriction channels is located only on an inlet side of the associated fluidic trap;
an inlet;
an outlet; and
a main channel with a plurality of portions that connects the inlet to the plurality of fluidic traps, associated hydrophilic capillary constriction channels and associated bypass channels, and the outlet.

2. The microfluidic serial dilution platform based well-plate of claim 1 wherein the inlet includes an interface for a pipettor, pipette or other fluid driving mechanism.

3. The microfluidic serial dilution platform based well-plate of claim 1 wherein the well-plate is located on a chip.

4. The microfluidic serial dilution platform based well-plate of claim 1 wherein the plurality of fluidic traps are arranged in a serial circuit with each other.

5. The microfluidic serial dilution platform based well-plate of claim 1 wherein the plurality of fluidic traps are arranged in a parallel circuit with each other.

6. The microfluidic serial dilution platform based well-plate of claim 1 wherein the plurality of fluidic traps comprises a plurality of networks of fluidic traps each including at least four fluidic traps.

7. The microfluidic serial dilution platform based well-plate of claim 1 wherein the plurality of fluidic traps comprises more than one hundred fluidic traps.

8. The microfluidic serial dilution platform based well-plate of claim 1 wherein the plurality of fluidic traps comprises a number of fluidic traps configured to meet requirements based on a desired application of the microfluidic serial dilution platform based well-plate.

9. The microfluidic serial dilution platform based well-plate of claim 1 further comprising a plurality of enlarged main channel portions configured to optimize a reduction of air invading into the plurality of fluidic traps, wherein one of the plurality of enlarged main channel portions is located on an outlet side of each of the plurality of fluidic traps.

10. The microfluidic serial dilution platform based well-plate of claim 1 wherein each of the plurality of fluidic traps is a square-shaped trap.

11. The microfluidic serial dilution platform based well-plate of claim 1 wherein the inlet, the outlet, the main channel, and the plurality of fluidic traps with the associated hydrophilic capillary constriction channels and associated bypass channels form a network, and the well-plate further comprises:
a reservoir, filled with water open to atmosphere and substantially at a constant pressure, that surrounds the network of inlet, outlet, main channel, fluidic traps, hydrophilic capillary constriction channels and bypass channels; and
a cover that covers the reservoir and the network of inlet, outlet, main channel, fluidic traps, hydrophilic capillary constriction channels and bypass channels, wherein the cover includes a plurality of holes, each hole extends into one of the plurality of fluidic traps, and the fluidic traps are open to atmosphere through the holes when the holes are uncovered.

12. A microfluidic serial dilution platform based well-plate, comprising:
a plurality of fluidic traps;
a plurality of hydrophobic capillary constriction channels;
a plurality of bypass channels, wherein each of the plurality of bypass channels is associated with one of the plurality of fluidic traps, each of the plurality of hydrophobic capillary constriction channels is associated with one of the plurality of fluidic traps, and each of the plurality of fluidic traps is associated with one of the plurality of bypass channels and one of the plurality of hydrophobic capillary constriction channels, wherein each fluidic trap and the associated bypass channel are connected in parallel and each fluidic trap and the associated hydrophobic capillary constriction channel are connected in series, each fluidic trap has a larger width than the associated bypass channel to trap fluid in said each fluidic trap while the fluid is removed from the associated bypass channel, and each of the hydrophobic capillary constriction channels is located only on an outlet side of the associated fluidic trap;
an inlet;
an outlet; and
a main channel with a plurality of portions that connects the inlet to the plurality of fluidic traps, associated hydrophobic capillary constriction channels and associated bypass channels, and the outlet.

13. The microfluidic serial dilution platform based well-plate of claim 12 wherein each of the plurality of fluidic traps is a square-shaped trap.

14. The microfluidic serial dilution platform based well-plate of claim 12 wherein the inlet, the outlet, the main channel, and the plurality of fluidic traps with the associated hydrophobic capillary constriction channels and associated bypass channels form a network, and the well-plate further comprises:
a reservoir, filled with water open to atmosphere and substantially at a constant pressure, that surrounds the network of inlet, outlet, main channel, fluidic traps, hydrophobic capillary constriction channels and bypass channels; and
a cover that covers the reservoir and the network of inlet, outlet, main channel, fluidic traps, hydrophobic capillary constriction channels and bypass channels, wherein the cover includes a plurality of holes, each hole extends into one of the plurality of fluidic traps, and the fluidic traps are open to atmosphere through the holes when the holes are uncovered.

15. A method of operating a microfluidic serial dilution platform based well-plate, comprising:
inserting fluid into a main channel of the well-plate through an inlet;
causing the fluid to enter into a bypass channel associated with a fluidic trap, wherein the bypass channel and the associated fluidic trap are connected in parallel;
causing the fluid to enter into the fluidic trap through a hydrophilic capillary constriction channel associated with the fluidic trap until the fluidic trap is filled with the fluid, wherein the fluidic trap and the associated hydrophilic capillary constriction channel are connected in series;
inserting air into the main channel of the well-plate through the inlet after the fluidic trap is filled with the fluid; and
causing the air to enter into the bypass channel and remove the fluid from the bypass channel while the fluid in the fluidic trap remains in the fluidic trap and air does not enter owing to the hydrophilic nature of the hydrophilic capillary constriction channel.

16. The method of claim 15 further comprising:
inserting diluting fluid into the main channel of the well-plate through the inlet; and
causing the diluting fluid to enter into the fluidic trap through the hydrophilic capillary constriction channel associated with the fluidic trap.

17. The method of claim 15 further comprising repeating the steps for additional fluidic traps on the well-plate.

18. The microfluidic serial dilution platform based well-plate of claim 1, wherein the well-plate uses an oil-free immiscible phase driven by manual or electronic pipettors.

19. The method of claim 15 wherein said removing the fluid from the bypass channel including aspirating the fluid in the bypass channel.

* * * * *